United States Patent Office 3,073,830
Patented Jan. 15, 1963

---

3,073,830
3-CARBAMYL PSEUDOTROPINE AND PROCESS
Sydney Archer, Bethlehem, and Malcolm R. Bell, East Greenbush, N.Y., assignors to Sterling Drug Inc., New York, N.Y., a corporation of Delaware
No Drawing. Application Jan 8, 1960, Ser. No. 1,388, which is a division of application Ser. No. 731,857, Apr. 30, 1958. Divided and this application Sept. 28, 1961, Ser. No. 141,309
2 Claims. (Cl. 260—292)

This invention relates to intermediates in the preparation of compounds having the formula

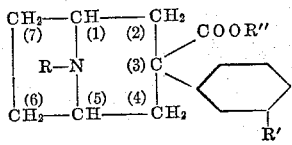

I wherein R represents hydrogen, a lower-aliphatic hydrocarbon, monocarbocyclic aryl substituted lower-aliphatic hydrocarbon, or a monocarbocyclic arylamino substituted lower aliphatic hydrocarbon radical, R' represents hydrogen, a lower-alkoxy radical, the hydroxy radical or a carboxylic acyloxy radical, and R" represents a lower-alkyl radical.

One approach to the compounds of the invention of Formula I is set forth in the following flow-sheet (R''' represents a lower-alkyl radical and R has the meaning given above):

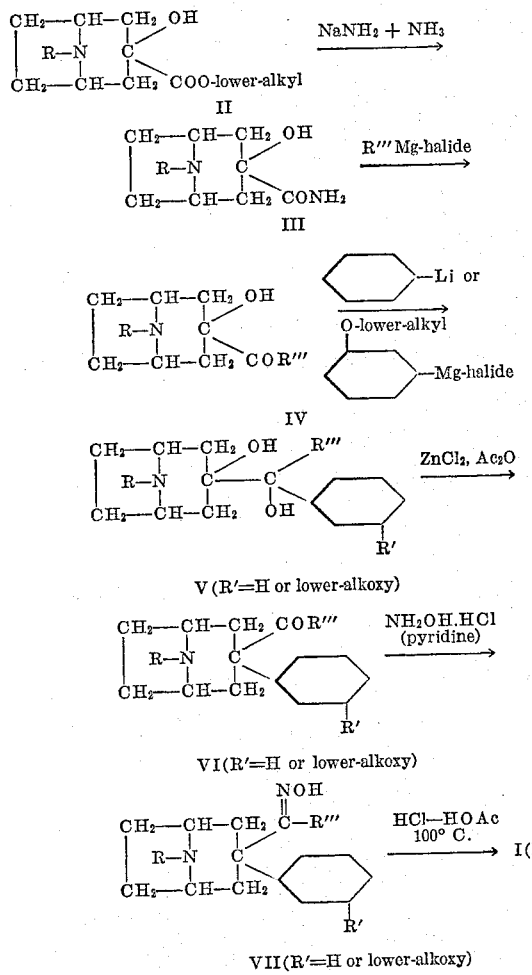

In this application the compounds of Formula III and their preparation are claimed.

A 3-hydroxy-3-carbo-lower-alkoxy-8-R-nortropane of structure II is converted to the corresponding amide, 3-hydroxy-3-carbamyl-8-R-nortropane (III), by treating with amide in liquid ammonia. The amide III is then subjected to a Grignard reaction with a lower-alkylmagnesium halide, the reaction stopping readily at the ketone stage to give a 3-hydroxy-3-lower-alkanoyl-8-R-nortropane (IV). The latter is then subjected to a second Grignard reaction with phenyllithium, phenylmagnesium halide or a 3-lower-alkoxyphenylmagnesium halide to produce a 3-hydroxy-3-[lower-alkyl(monocarbocyclic aryl)hydroxymethyl]-8-R-nortropane (V).

The diol V is then converted to the desired 3-(monocarbocyclic aryl)-3-lower alkanoyl-8-R-nortropane (VI) by treatment with zinc chloride and acetic anhydride at room temperature for ten or more hours.

The ketone VI is then converted to its oxime, a 3-(monocarbocyclic aryl)-3-(1-isonitroso-lower-alkyl)-8-R-nortropane (VII), by treatment with hydroxylamine.

The oxime VII is then subjected to the Beckmann rearrangement by heating it with hydrochloric and acetic acid at about 100° C. and the structure I (R"=H) is produced.

The molecular structures of the novel compounds herein disclosed are established by their mode of synthesis and corroborated by the correspondence of calculated and found values for the elementary analyses for representative examples. The structures are further confirmed by ultraviolet and infrared spectral data proving the presence of the various functional groups.

The compounds of our invention having the general Formula I possess valuable pharmacodynamic properties, in particular, analgesic activity.

The following examples will further illustrate the invention without the latter being limited thereby.

EXAMPLE 1

*3-carbamylpseudotropine* [III; R is $CH_3$].—To a solution of sodium amide, which had been prepared from 14 g. of sodium and a few crystals of ferric nitrate in 1 liter of liquid ammonia, was added 20 g. of α-ecgonine methyl ester (3-hydroxy-3-carbomethoxytropane). The reaction mixture was stirred at room temperature until the ammonia had evaporated, and the residue was decomposed by dropwise addition of 120 ml. of water. The aqueous phase was saturated with solid potassium carbonate and extracted several times with methylene chloride. The combined extracts were dried over anhydrous sodium sulfate and concentrated to give a colorless crystalline residue. The residue was triturated with 150 ml. of absolute ether to give 16.0 g. of 3-carbamylpseudotropine, M.P. 155.8–159.2° C. (corr.).

*Analysis.*—Calcd. for $C_9H_{16}N_2O_2$: C, 58.68; H, 8.76; N, 15.21. Found: C, 58.85; H, 8.69; N, 15.19.

EXAMPLE 2

*3-propionylpseudotropine* [IV; R is $CH_3$, R''' is $C_2H_5$].—To a stirred solution of ethylmagnesium bromide, prepared from 368 g. of ethyl bromide and 82.2 g. of magnesium in 2 liters of ether, was added a solution of 62.1 g. of 3-carbamylpseudotropine in 500 ml. of tetrahydrofuran. The resulting mixture was stirred and refluxed for fifteen hours and then decomposed by the dropwise addition of 840 ml. of concentrated hydrochloric acid. After standing for three hours at room temperature, the aqueous phase was made basic with an excess of solid potassium carbonate, and the solid which precipitated was collected by filtration and extracted twice with 3 liter portions of boiling chloroform. The aqueous filtrate was extracted five times with chloroform. The combined chloroform extracts were dried over anhydrous sodium sulfate and concentrated to yield 72 g. of crystalline solid. The latter was extracted with 1.5 liters of boiling hexane, and concentration of the extracts and cooling caused separation of 29.5 g. of 3-propionylpseudotropine, M.P. 120.6–123.4° C. (corr.) when recrystallized from hexane.

*Analysis.*—Calcd. for $C_{11}H_{19}NO_2$: C, 66.97; H, 9.71; N, 7.10. Found: C, 67.29; H, 9.61; N, 6.94.

EXAMPLE 3

*3 - (ethylphenylhydroxymethyl)pseudotropine hydrochloride* [V; R is $CH_3$, R' is H, R''' is $C_2H_5$].—To a solution of phenyllithium, prepared from 31.4 g. of bromobenzene and 2.8 g. of lithium wire in 500 ml. of ether, was added all at once a warm solution of 4.0 g. of 3-propionylpseudotropine in 150 ml. of tetrahydrofuran. After stirring and refluxing for one and one-half hours, the reaction mixture was cooled and hydrolyzed by the addition of 150 ml. of water. The aqueous phase was extracted twice with ether, and the ether extracts were dried over anhydrous sodium sulfate and concentrated to dryness in vacuo. The residue was dissolved in methylene dichloride, the solution dried over anhydrous sodium sulfate and concentrated to give 6.5 g. of a light yellow oil which crystallized upon standing at room temperature. The latter was dissolved in acetone and a slight excess of alcoholic hydrogen chloride was added. The salt which separated was collected by filtration, giving 5.0 g. of 3-(ethylphenylhydroxymethyl)pseudotropine hydrochloride, M.P. 212.4–213.8° C. (corr.) when recrystallized from a methanol-ether mixture.

*Analysis.*—Calcd. for $C_{17}H_{25}NO_2 \cdot HCl$: C, 65.48; H, 8.40; Cl, 11.38. Found: C, 65.59; H, 8.44; Cl, 11.23.

EXAMPLE 4

*3-phenyl-3-propionyltropane hydrochloride* [VI; R is $CH_3$, R' is H, R''' is $C_2H_5$].—A solution of 3.3 g. of 3-(ethylphenylhydroxymethyl)pseudotropine hydrochloride and 15 g. of fused, powdered zinc chloride in 30 ml. of acetic anhydride was stirred at room temperature for fifteen hours. The reaction mixture was poured into an excess of cold aqueous sodium hydroxide and the product was extracted with methylene dichloride. The extracts were dried and concentrated, and the residue was dissolved in 30 ml. of acetone and treated with an excess of alcoholic hydrogen chloride, whereupon there separated 2.2 g. of 3-phenyl-3-propionyltropane hydrochloride, M.P. 273.2–275.8° C. (corr.) when recrystallized from a methanol-ether mixture.

*Analysis.*—Calcd. for $C_{17}H_{23}NO \cdot HCl$: C, 69.49; H, 8.23; Cl, 12.07. Found: C, 69.26; H, 8.06; Cl, 12.02.

EXAMPLE 5

*3-phenyl-3-(1-isonitrosopropyl)tropane* [VII; R is $CH_3$, R' is H, R''' is $C_2H_5$] can be prepared by heating a solution of 3-phenyl-3-propionyltropane hydrochloride with hydroxylamine hydrochloride in a pyridine-ethanol solution.

EXAMPLE 6

*3-phenyl-3-carboxytropane hydrochloride* [I; R is $CH_3$, R' and R'' are H, β-series] can be prepared by heating 3-phenyl - 3 - (1-isonitrosopropyl)tropane hydrochloride with acetic acid saturated with hydrogen chloride.

EXAMPLE 7

*3-[ethyl(m-anisyl)hydroxymethyl]pseudotropine hydrochloride* [V; R is $CH_3$, R' is $OCH_3$, R''' is $C_2H_5$].—To a stirred solution of m-anisylmagnesium bromide prepared from 118 g. of m-bromoanisole and 15.3 g. of magnesium in 1 liter of ether under nitrogen was rapidly added a solution of 15.0 g. of 3-propionylpseudotropine in 250 ml. of tetrahydrofuran. The reaction mixture was refluxed and stirred for three hours, left at room temperature for fifteen hours and then poured into a cold solution of 66 ml. of concentrated hydrochloric acid in 400 ml. of water. The aqueous phase was made basic with solid potassium carbonate, and the inorganic salts were removed by filtration and washed with methylene dichloride. The filtrate was extracted with methylene dichloride and the combined methylene dichloride washings and extracts were dried and concentrated in vacuo. The residue was dissolved in acetone and treated with an excess of ethanolic hydrogen chloride whereupon there separated 14.5 g. of 3-[ethyl(m-anisyl)hydroxymethyl]pseudotropine hydrochloride, M.P. 245–245.5° C. (dec.) (uncorr.) after recrystallization from a methanol-ether mixture.

*Analysis.*—Calcd. for $C_{18}H_{27}NO_3 \cdot HCl$: C, 63.23; H, 8.25; Cl, 10.37. Found: C, 63.59; H, 8.17; Cl, 10.15.

EXAMPLE 8

*3-(m-anisyl)-3-propionyltropane hydrochloride* [VI; R is $CH_3$, R' is $OCH_3$, R''' is $C_2H_5$] was prepared from 14.2 g. of 3-[ethyl(m-anisyl)hydroxymethyl]pseudotropine hydrochloride and 28.4 g. of zinc chloride in 280 ml. of acetic anhydride according to the manipulative procedure described above in Example 4. There was thus obtained 7.9 g. of 3-(m-anisyl)-3-propionyltropane hydrochloride, M.P. 237.5–238.5° C. (uncorr.) when recrystallized first from a methanol-ether mixture and then from an isopropyl alcohol-ether mixture.

*Analysis.*—Calcd. for $C_{18}H_{25}NO_2 \cdot HCl$: C, 66.75; H, 8.09; Cl, 10.95. Found: C, 66.94; H, 8.07; Cl 10.97.

EXAMPLE 9

*3-(m-anisyl)-3-(1-isonitrosopropyl)tropane hydrochloride* [VII; R is $CH_3$, R' is $OCH_3$, R''' is $C_2H_5$] can be prepared by heating 3-(m-anisyl)-3-propionyltropane hydrochloride and hydroxylamine hydrochloride in pyridine-ethanol solution.

EXAMPLE 10

*3-(m-anisyl)-3-carboxytropane hydrochloride* [I; R is $CH_3$, R' is $OCH_3$, R'' is H] can be prepared by heating 3-(m-anisyl)-3-(m-anisyl) - 3 - (1-isonitrosopropyl)tropane hydrochloride in acetic acid saturated with hydrogen chloride.

This application is a division of our copending application, Serial No. 1388, filed January 8, 1960, which in turn is a division of our copending application, Serial No. 731,857, filed April 30, 1958.

We claim:

1. 3-carbamylpseudotropine.

2. The process for preparing 3-carbamylpseudotropine which comprises treating a 3-hydroxy-3-carbo-lower-alkoxytropane with sodium amide in liquid ammonia.

No references cited.

UNITED STATES PATENT OFFICE
CERTIFICATE OF CORRECTION

Patent No. 3,073,830 January 15, 1963

Sydney Archer et al.

It is hereby certified that error appears in the above numbered patent requiring correction and that the said Letters Patent should read as corrected below.

Column 2, line 21, for "(VH)" read -- (VII) --; column 4, line 52, for "3-(m-anisyl)-3-(m-anisyl)-3-" read -- 3-(m-anisyl)-3- --.

Signed and sealed this 1st day of October 1963.

(SEAL)
Attest:

ERNEST W. SWIDER
Attesting Officer

DAVID L. LADD
Commissioner of Patents